US012662037B2

(12) United States Patent
Kwon et al.

(10) Patent No.: US 12,662,037 B2
(45) Date of Patent: Jun. 23, 2026

(54) ASSIST HANDLE FOR VEHICLES

(71) Applicant: DAEHAN SOLUTION CO., LTD, Incheon (KR)

(72) Inventors: Choong Ho Kwon, Seoul (KR); Sehwi Lee, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 388 days.

(21) Appl. No.: 18/238,656

(22) Filed: Aug. 28, 2023

(65) Prior Publication Data

US 2024/0092244 A1    Mar. 21, 2024

(30) Foreign Application Priority Data

Sep. 21, 2022    (KR) ........................ 10-2022-0118997

(51) Int. Cl.
B60N 3/02 (2006.01)
B60R 7/10 (2006.01)
B60R 11/00 (2006.01)

(52) U.S. Cl.
CPC .................. B60N 3/02 (2013.01); B60R 7/10 (2013.01); *B60R 2011/0028* (2013.01)

(58) Field of Classification Search
CPC .. B60N 3/02; B60N 3/023; B60R 7/10; B60R 2011/0028; B60R 2011/0082
USPC ................................................ 296/1.02, 37.8
See application file for complete search history.

(56) References Cited

U.S. PATENT DOCUMENTS 6,397,435 B1 * 6/2002 Gosselet ................ B60N 3/023
                                                                224/313
10,399,476 B2 * 9/2019 Ranganathan ............ B60R 7/04

2003/0074767 A1 * 4/2003 Chang .................... B60N 3/023
                                                                16/438
2004/0036304 A1 * 2/2004 Thompson ............. B60N 3/023
                                                                296/1.02
2010/0187393 A1 * 7/2010 Lee .......................... B60R 7/10
                                                                248/288.11

FOREIGN PATENT DOCUMENTS

KR        2020070000916 U      8/2007
KR        1020180133262 A     12/2018
KR        1020200071157 A      6/2020

* cited by examiner

*Primary Examiner* — Roger L Pang
(74) *Attorney, Agent, or Firm* — Dickinson Wright PLLC

(57)              ABSTRACT

The present invention may provide an assist handle for vehicles manufactured to minimally expose a coat hook to the outside and also feel a sense of unity with the assist handle when the coat hook is not used by configuring the assist handle so that the coat hook is stored in a storage space of the assist handle by elastic support and the coat hook closes an entrance of the storage space, thereby improving the aesthetic appearance and beauty of the assist handle and its surroundings. In particular, the coat hook may be conveniently used at a desired position without spoiling the aesthetic appearance and beauty of a vehicle interior by mounting the coat hook on a part where the assist handle is rotatably supported on a headliner to feel a sense of unity. In addition, the coat hook may provide stable support even when a predetermined amount of gravity is applied to the coat hook by configuring a center of rotation of the coat hook to be positioned under a center of rotation of the assist handle on a support bracket supporting rotation of the assist handle.

2 Claims, 5 Drawing Sheets

H (a)

(b)

ASSIST HANDLE FOR VEHICLES

CROSS-REFERENCE TO RELATED APPLICATION

This application claims priority to and the benefit of Korean Patent Application No. 10-2022-0118997, filed on Sep. 21, 2022, the disclosure of which is incorporated herein by reference in its entirety.

BACKGROUND

1. Field of the Invention

The present invention relates to an assist handle for vehicles, and more particularly, to an assist handle for vehicles capable of improving the aesthetic appearance and beauty around the assist handle and easily flipping a coat hook as necessary to allow convenient use, by configuring the assist handle to be stored in a handle body so as not to be seen from the outside when the coat hook is not used. In addition, the present invention allows the coat hook to provide stable support even when a certain amount of load is applied to the coat hook, by installing an axis of rotation of the coat hook on a support bracket so that the axis of rotation of the coat hook is positioned under an axis that is a center of rotation of the handle body.

2. Discussion of Related Art

In general, coat hooks (hangers) are provided in a vehicle interior in various ways so that a driver or an occupant is able to hang clothes that are being used or intended to be used, as disclosed in Korean Utility Model Publication No. 20-2007-0000916 (published on Aug. 20, 2007), Korean Patent Publication No. 10-2020-0071157 (published on Jun. 19, 2020), and Korean Patent Publication No. 10-2018-0133262 (published on Dec. 14, 2018).

Korean Utility Model Publication No. 20-2007-0000916 discloses a vehicle hanger holder capable of storing a driver's or occupant's suits or coats so that the suits or coats are not wrinkled, wherein the detachable vehicle hanger holder is used to be detachably attached to headrest connecting rods at the back of a driver's seat and a front passenger's seat, and includes a hook on which a general household hanger is usable, a support rod that is adjustable in intervals according to connecting rods for headrest connecting rods with different intervals for each vehicle and each vehicle type, and a saddle for the headrest connecting rods with different intervals for each vehicle and each vehicle type, and since the general household hanger is used, a common household hanger is used without the inconvenience of separately hanging extra clothes in the vehicle when traveling on a business trip, and thus the vehicle hanger holder has the convenience and characteristics of being able to move without independently separating clothes depending on home and business trip accommodations.

In Korean Patent Publication No. 10-2020-0071157, a coat hook may be configured to be stored in a handle body when the coat hook is not used and be drawn out only when the coat hook is used, and thus an auxiliary handle can be used as the coat hook without causing inconvenience to occupants using the auxiliary handle, and the coat hook can be made to look integral with a handle body, thereby reducing the sense of difference. In particular, since the coat hook is configured so that it can be easily drawn out from the handle body by pressing a slider supporting the coat hook, anyone can easily draw out the slide and use the slide as a hanger quickly and conveniently when he or she tries to hang a coat. In addition, since the coat hook is configured to be stored in or drawn out from a storage space in a one-touch manner as described above, the coat hook can have a simple structure and be conveniently used by drawing out the coat hook through a simple operation of pressing the slider.

In Korean Patent Publication No. 10-2018-0133262, since a hook part of a hanger body is configured to rotate directly on a headliner, even in situations such as sudden braking, a hanger is kept from falling off the headliner, and thus it is possible to safely and cleanly hang and store clothes. In particular, since an LED is mounted on the hanger body so that the LED illuminates the headliner when the hanger body is not used, not only can a position of the hanger be easily identified through the lighting effect, but also the interior atmosphere of a vehicle can be improved through an indirect lighting effect. In addition, since the hanger is configured to be in close contact with the headliner when the hanger is not used and rotate toward the vehicle interior when the hanger is used through a rotating device, the hanger can be safely and conveniently used as needed.

The hanger (coat hook) C is mounted on a headliner H facing a roof panel in the vehicle interior, as shown in FIGS. 1 to 3, and in particular, is configured to be used as the hanger when an assist handle A is not used.

SUMMARY OF THE INVENTION

However, a coat hook used when an assist handle is not used has the following problems.

(1) As the coat hook is configured to be exposed to a vehicle interior near the assist handle, the coat hook spoils the aesthetic appearance and beauty of the vehicle interior.

(2) In this case, although the entire shape of the coat hook is not exposed to the vehicle interior, the coat hook itself does not match the assist handle and its surroundings, making it difficult to obtain the aesthetic appearance and beauty of an intended design.

(3) In particular, such aesthetic appearance and beauty become more difficult to obtain when the coat hook is a fixed-type.

(4) That is, there are a coat hook used by being integrally fixed to a surface of a headliner where the assist handle is mounted, and a coat hook that is partially hidden by the assist handle to some extent when the coat hook is not used and comes out only when the coat hook is used. Therefore, the fixed-type coat hook has a problem of being always exposed to the vehicle interior even when the assist handle is used, and the rotating coat hook solves the problem of being exposed to the vehicle interior to some extent, but the coat hook itself spoils the aesthetic appearance and beauty of the assist handle and its surroundings.

The present invention has been made in consideration of the above-mentioned problems, and is directed to providing an assist handle for vehicles manufactured to minimally expose a coat hook to the outside and also feel a sense of unity with the assist handle when the coat hook is not used by configuring the assist handle so that the coat hook is stored in a storage space of the assist handle by elastic support and the coat hook closes an entrance of the storage space, thereby improving the aesthetic appearance and beauty of the assist handle and its surroundings.

In particular, the present invention is also directed to providing an assist handle for vehicles capable of conveniently using a coat hook at a desired position without spoiling the aesthetic appearance and beauty of a vehicle interior by mounting the coat hook on a part where the assist handle is rotatably supported on a headliner to feel a sense of unity.

In addition, the present invention is also directed to providing an assist handle for vehicles allowing a coat hook to provide stable support even when a predetermined amount of gravity is applied to the coat hook by configuring a center of rotation of the coat hook to be positioned under a part that is a center of rotation of the assist handle on a support bracket mounted on a headliner to support rotation of the assist handle.

According to an aspect of the present invention, there is provided an assist handle for vehicles including a handle body (100) mounted to be rotated and unfolded by elastic support by a headliner (H) installed in a vehicle interior to face a roof panel of a vehicle, in which a storage space (110) is formed in the handle body (100) and a coat hook (111) is mounted in the storage space (110) to be rotated in place by elastic support of a spring, and the coat hook (111) closes an entrance of the storage space (110) when the coat hook (111) is stored in the storage space (110).

In particular, the coat hook (111) may be installed to be rotated by elastic support under a pin (P) for rotatably supporting the handle body (100) on a support bracket (B) mounted on the headliner (H).

Further, the coat hook (111) may be installed at each of both ends of the handle body (100) that are rotatably installed on the headliner (H).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
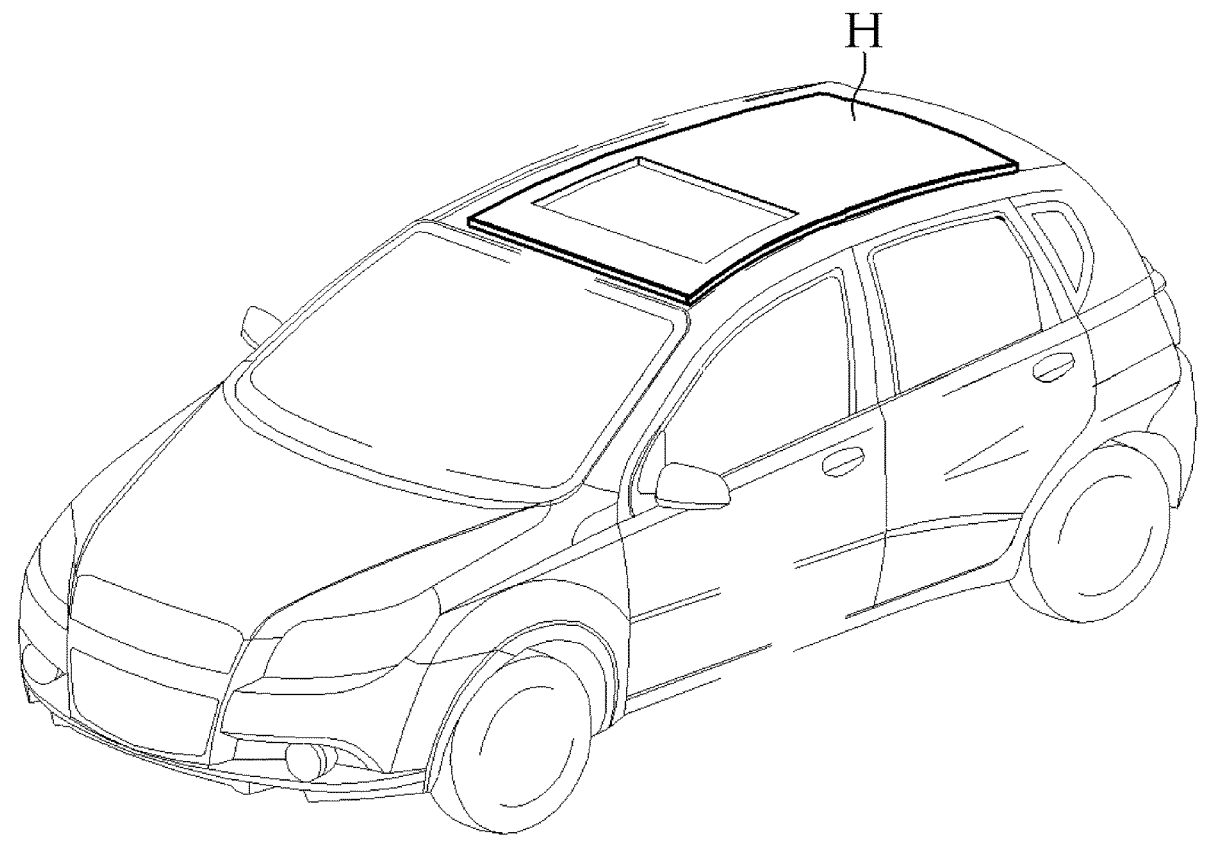
FIG. 1 is a perspective view of a vehicle showing an installation position of a headliner on which an assist handle is mounted.
Figure 2:
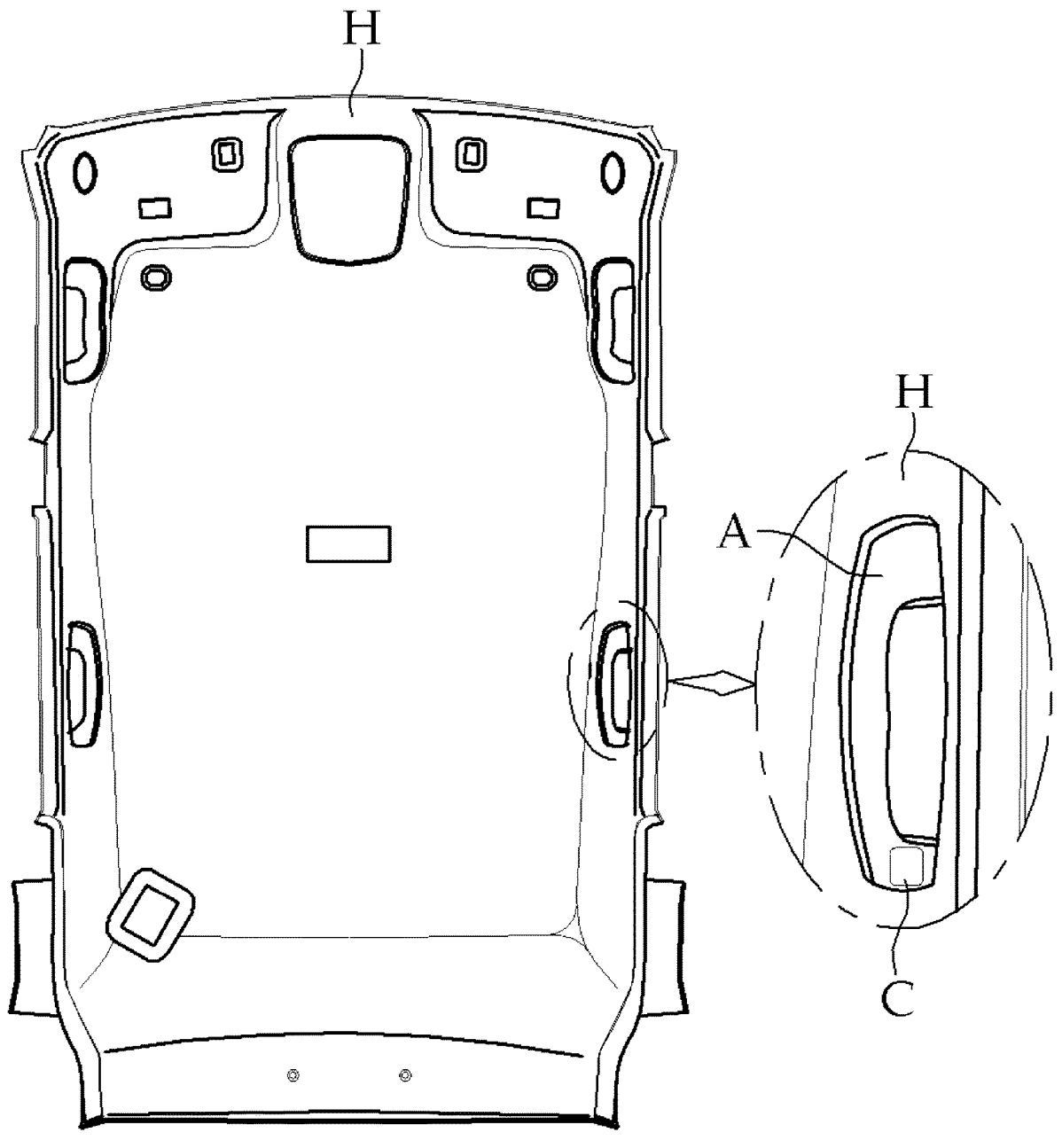
FIG. 2 is a perspective view of the headliner for vehicles showing a position of the assist handle.
Figure 3:
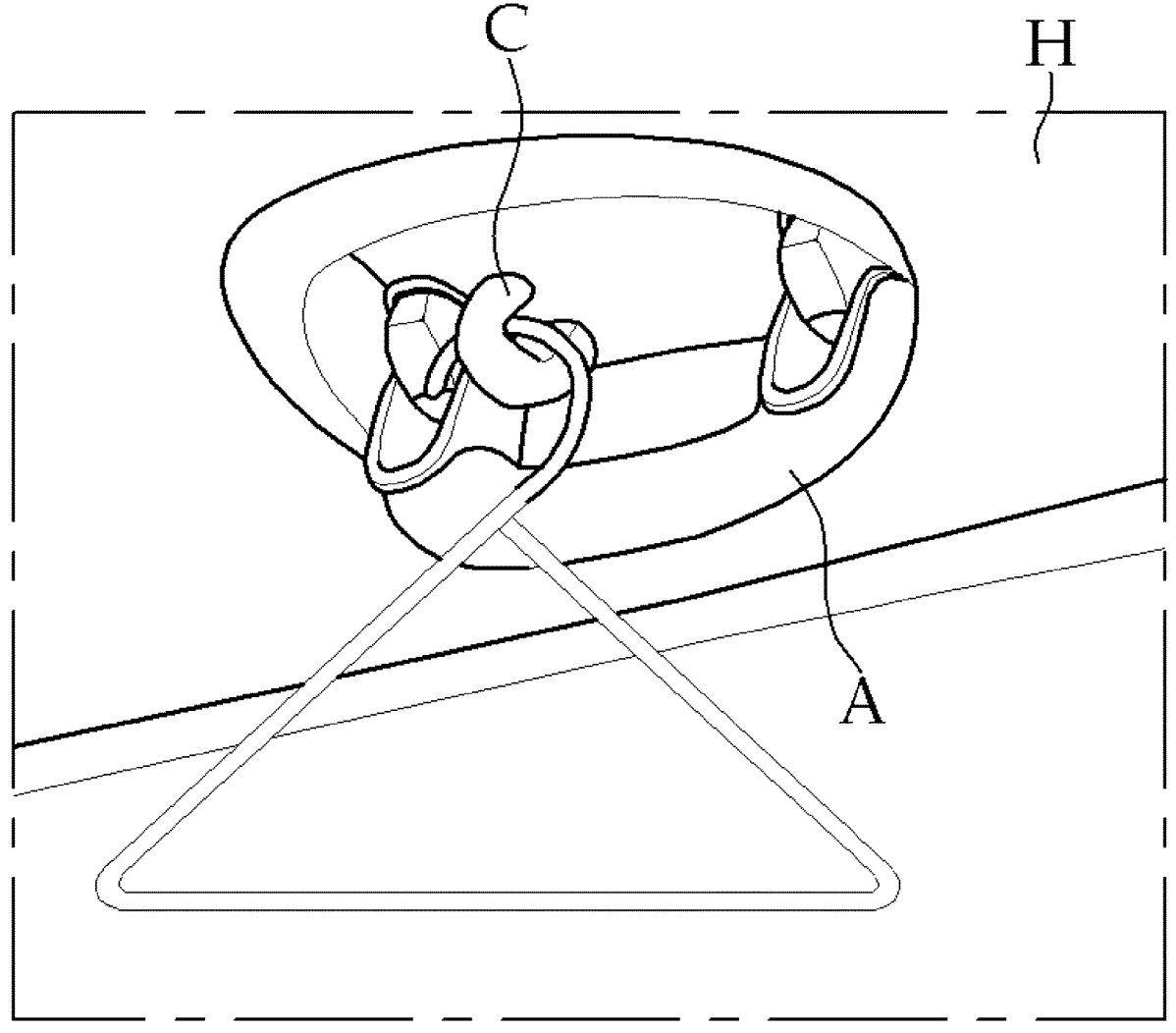
FIG. 3 is a perspective view showing the state of use of an assist handle mounted on a headliner integrally with an existing coat hook.

Hereinafter, preferred embodiments of the present invention will be described in more detail with reference to the accompanying drawings. Prior to the description, terms or words used in this specification and claims should not be restrictively interpreted as ordinary meanings or dictionary-based meanings, but should be interpreted as meanings and concepts conforming to the technical aspects of the present invention according to the principle that an inventor is allowed to properly define concepts of terms to describe his or her invention in the best ways.

Therefore, embodiments described in the specification and configurations shown in the drawings are merely the most preferred embodiment of the present invention, but are not intended to fully describe the technical aspects of the present invention, so it should be understood that a variety of other equivalents and modifications could be made thereto at the time of filing the application.

[Configuration of Assist Handle for Vehicles]

Figure 4:
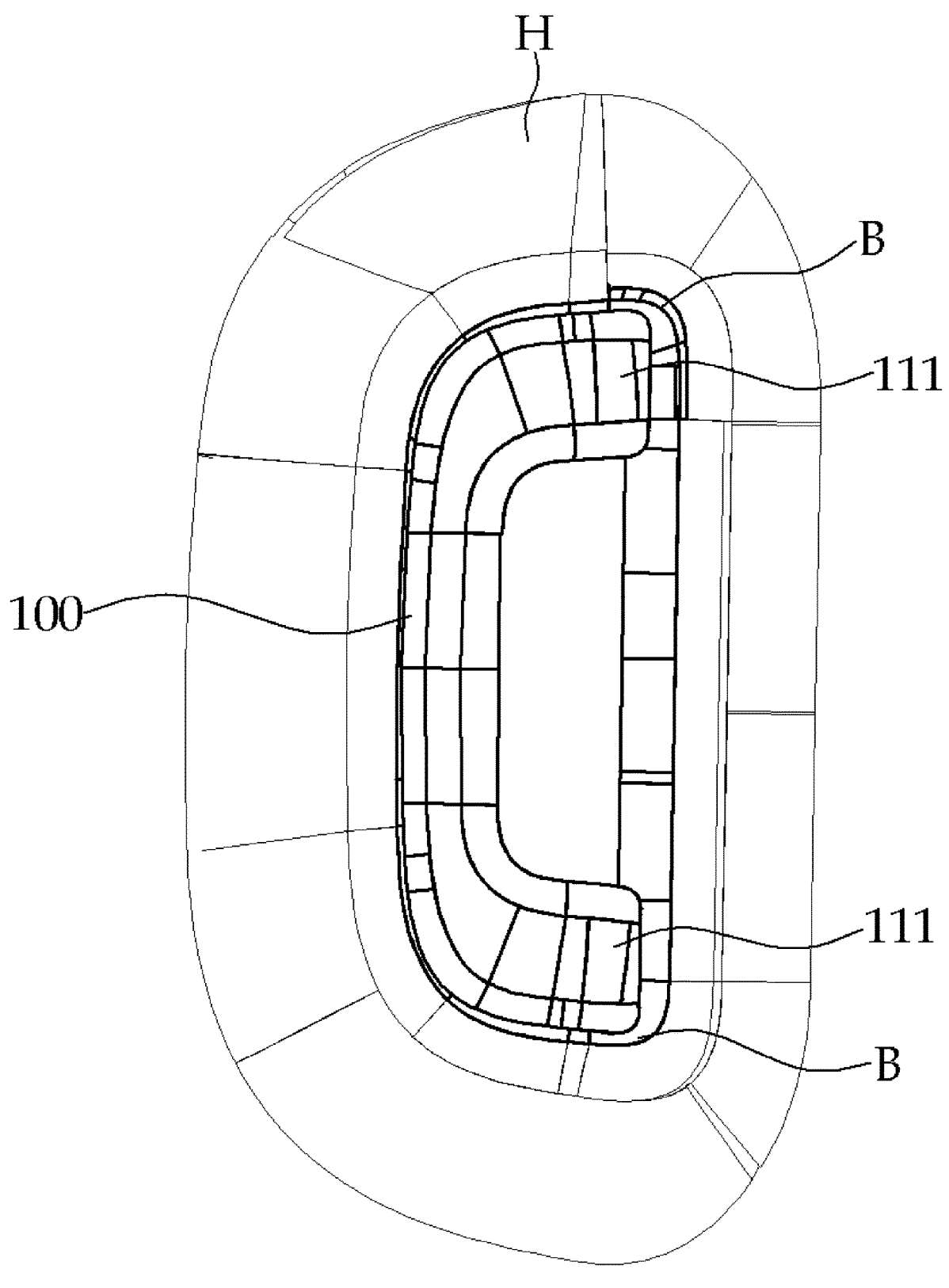
FIG. 4 is an enlarged bottom view of a part of a headliner to show an assist handle for vehicles stored integrally with a coat hook according to the present invention.
Figure 5:
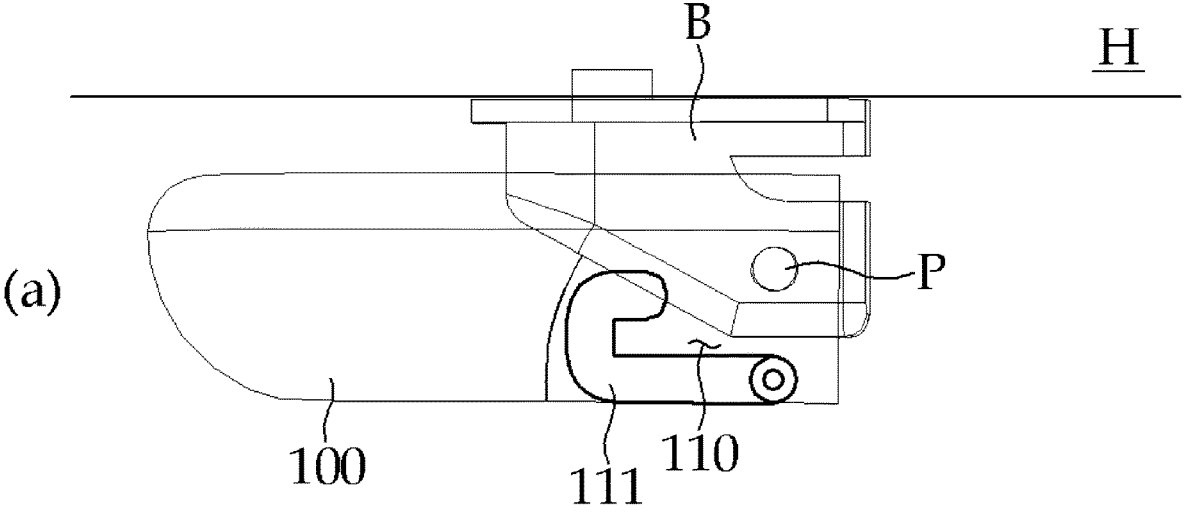
FIG. 5 is a schematic diagram showing states before (a) and after (b) use of the coat hook integrally configured with the assist handle according to the present invention.
Figure 5:
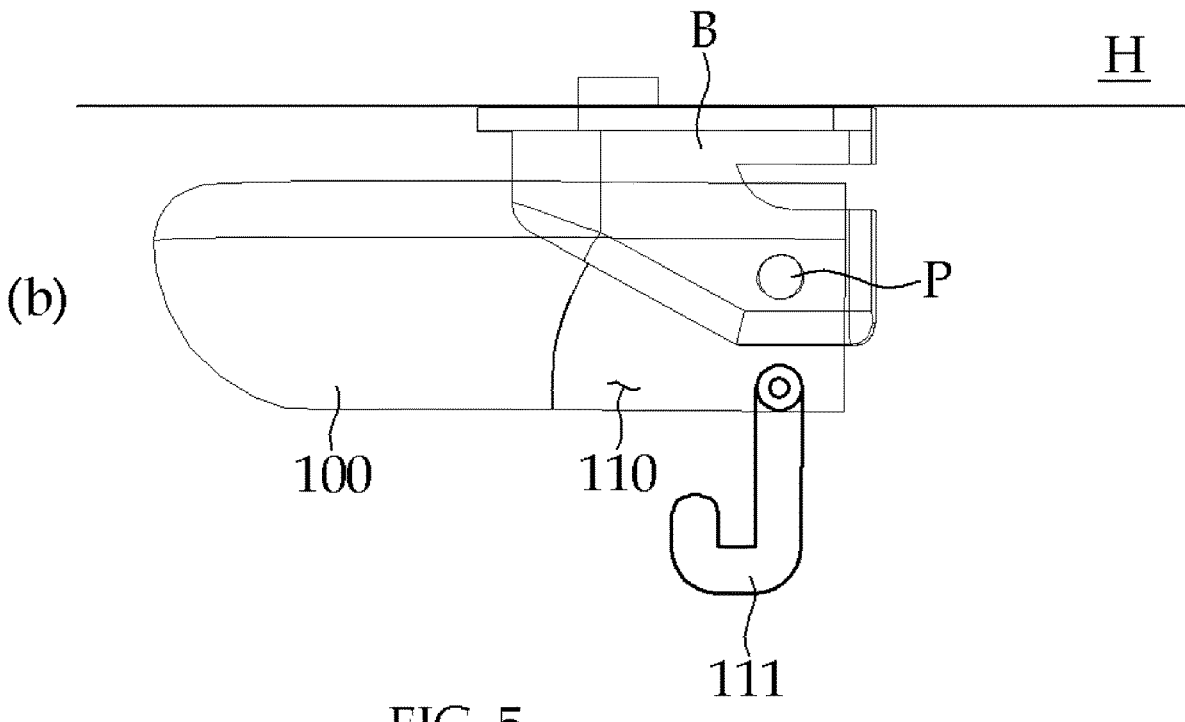

As shown in FIGS. 4 and 5, an assist handle for vehicles according to the present invention includes a handle body 100 used by being forcibly rotated with respect to a pin P by elastic support by a support bracket B mounted on a headliner H.

In particular, a storage space 110 is formed in the handle body 100, a coat hook 111 may be configured to be used by being forcibly rotated by the elastic support in the storage space 110 and the coat hook 111 may be further configured to close an entrance of the storage space 110 so that the coat hook 111 becomes integral with the handle body 100 when the coat hook 111 is not used, thereby improving the aesthetic appearance and beauty.

In this case, the coat hook 111 is mounted on the handle body 100 so that a rotationally supported part thereof is positioned under the pin P, and thereby, even if a load is applied to the coat hook 111, the handle body 100 is not forcibly rotated, and thus the coat hook 111 may be safely and conveniently used.

In addition, the coat hook 111 may be installed at each mounted on the support bracket B to rotatably support the handle body 100, and thereby the coat hook 111 may be easily and conveniently used at any time as necessary while being integral with the handle body 100.

Hereinafter, such a configuration will be described in more detail with reference to the accompanying drawings.

A. Handle Body

As shown in FIGS. 4 and 5, the handle body 100 is mounted to be rotated in place with respect to the pin P by elastic support by the support bracket B mounted on the headliner H.

In particular, as shown in FIGS. 4 and 5, the handle body 100 stays in close contact at a place formed on the headliner H by the elastic support, and when an occupant uses the handle body 100, the occupant grabs the handle body 100 and forcibly rotates the handle body 100 on the headliner H. The handle body 100 manufactured by techniques in the related art in the technical field to which the present invention pertains may be used.

Meanwhile, the handle body 100 may be configured to, when the handle body 100 is mounted on the headliner H, be rotated in place by mounting both ends thereof on two support brackets B mounted on the headliner H, as shown in FIG. 4, and although not shown in the drawings, configured to be used by mounting only one side of the handle body 100 on one support bracket B to be rotated in place.

In the handle body 100 made in this way, as shown in FIG. 5, the storage space 110 is formed.

B. Storage Space

As shown in FIG. 5, the storage space 110 is formed in the handle body 100 described above, the coat hook 111 to be described below is stored therein, and the storage space 110 is formed in a size where the coat hook 111 is rotated so that the coat hook 111 is stored therein or the stored coat hook 111 is drawn out.

In particular, in a preferred embodiment of the present invention, as shown in FIG. 5, the storage space 110 is formed at an end portion of the handle body 100 mounted on the support bracket B, so that, even if a load is applied by hanging a hanger or hanging clothes on the coat hook 111 installed in the storage space 110, the handle body 100 is prevented from being forcibly rotated downward, and thus the coat hook 111 may be conveniently used.

In addition, in a preferred embodiment of the present invention, as shown in FIGS. 4 and 5, when the handle body 100 is installed to be rotatably supported by the two support brackets B, one storage space 110 is formed at each of both end portions of the handle body 100, and thereby it is preferable to use one coat hook 111 at a desired position or use two coat hooks 111 at the same time among the coat hooks 111 stored in the respective storage spaces 110.

The coat hook 111 is mounted in the storage space 110 thus formed, as shown in FIGS. 4 and 5.

C. Coat Hook

The coat hook 111 is mounted in the storage space 110 described above, as shown in FIGS. 4 and 5.

In this case, the coat hook 111 is configured to be stored in the storage space 110 using a pin or the like and then forcibly rotated to hang hangers or clothes. To this end, a spring may be mounted on the pin serving as a center of rotation of the coat hook 111, and the spring may be configured to provide an elastic force so that the coat hook 111 is forcibly stored in the storage space 110 at all times.

In addition, in a preferred embodiment of the present invention, as shown in FIGS. 4 and 5, by configuring the coat hook 111 to close the entrance of the storage space 110 to feel a sense of unity between the handle body 100 and the coat hook 111 when the coat hook 111 is stored in the storage space 110 by the elastic support, the problem of spoiling the aesthetic appearance and beauty of the vehicle interior due to the assist handle and coat hook not matching in the vehicle interior or being exposed to the outside may be solved.

Further, in a preferred embodiment of the present invention, as shown in FIG. 5, by installing the coat hook 111 in the storage space 110 so that the center of rotation of the coat hook 111 is positioned under the pin P, which is the center of rotation of the handle body 100 in the support bracket B, it is preferable that, even if an external force is applied in a direction of gravity by hanging a hanger or clothes on the coat hook 111, the handle body 100 may maintain a state in close contact with the headliner H, and thus the coat hook 111 may be safely and conveniently used.

Finally, in a preferred embodiment of the present invention, as shown in FIG. 4, by providing one coat hook 111 at each of both ends of the handle body 100 when the both ends of the handle body 100 are supported by the two support brackets B, it is preferable that the coat hooks may be conveniently used according to a driver's and occupant's choice, such as using two coat hooks 111 at the same time or hanging a hanger and clothes separately on the respective coat hooks.

As described above, the present invention may be configured so that the coat hook is stored in the handle body and not exposed to the outside, so that the coat hook may be easily and conveniently used at any time as necessary without spoiling the aesthetic appearance and beauty of the vehicle interior.

An assist handle for vehicles according to the present invention has the following effects.

(1) Since a coat hook is stored in a storage space formed in a handle body and closes an entrance of the storage space, the coat hook can be configured to be integrated with the handle body, thereby improving the aesthetic appearance and beauty of the assist handle.

(2) In particular, when the coat hook is not used, a sense of unity with the handle body can be felt, thereby further enhancing a closing effect of a vehicle interior.

(3) In addition, since the coat hook is stored in the assist handle when the assist handle is used, an occupant can safely and conveniently use the assist handle.

(4) Accordingly, safety accidents that may occur when the coat hook gets caught in the hand or clothing worn by an occupant when the assist handle is used can be prevented in advance, thereby safely and conveniently using the assist handle.

(5) Meanwhile, by configuring the coat hook to be forcibly rotated in a state in which the assist handle is attached to a headliner when the coat hook is used so that the coat hook is able to hang hangers or clothes, it is possible to easily and conveniently use the coat hook by forcibly rotating the coat hook only as necessary.

(6) By providing the coat hook at an end on which the assist handle is rotatably supported, one or two coat hooks can be provided on the assist handle, thereby conveniently using the coat hooks around the assist handle when the coat hooks are used.

What is claimed is:

1. An assist handle for vehicles comprising:

a handle body (100) mounted to be rotated and unfolded by elastic support by a headliner (H) installed in a vehicle interior to face a roof panel of a vehicle, wherein a storage space (110) is formed in the handle body (100), and a coat hook (111) is mounted in the storage space (110) to be rotated in place by elastic support of a spring, and the coat hook (111) closes an entrance of the storage space (110) when the coat hook (111) is stored in the storage space (110), wherein the coat hook (111) is installed to be rotated by elastic support of the spring, wherein the spring is located vertically below a pin (P), said pin rotatably supporting the handle body (100) on a support bracket (B) mounted on the headliner (H).

2. The assist handle for vehicles of claim 1, wherein the coat hook (111) is installed at each of both ends of the handle body (100) that are rotatably installed on the headliner (H).

* * * * *